VIDEO SYSTEM WITH TRANSIENT AND DROPOUT COMPENSATION

Filed Feb. 20, 1959 4 Sheets-Sheet 1

INVENTOR.
Ray M. Dolby
BY
Flehr & Swain
ATTORNEYS

INVENTOR.
Ray M. Dolby
BY [signature]
ATTORNEYS

VIDEO SYSTEM WITH TRANSIENT AND DROPOUT COMPENSATION

Filed Feb. 20, 1959 4 Sheets-Sheet 3

INVENTOR.
Ray M. Dolby
BY Fleher & Swain
ATTORNEYS

VIDEO SYSTEM WITH TRANSIENT AND DROPOUT COMPENSATION

Filed Feb. 20, 1959

4 Sheets-Sheet 4

INVENTOR.
Ray M. Dolby
BY Flehr & Swain
ATTORNEYS 2,996,576
Patented Aug. 15, 1961

2,996,576

VIDEO SYSTEM WITH TRANSIENT AND DROPOUT COMPENSATION

Ray M. Dolby, Cambridge, England, assignor to Ampex Corporation, Redwood City, Calif., a corporation of California Filed Feb. 20, 1959, Ser. No. 794,579
14 Claims. (Cl. 178—6.6)

This invention relates generally to a video system and method, and more particularly to a video system and method in which video disturbances due to transient noise are minimized.

As is well known, a television picture is formed by a scanning technique in which a plurality of adjacent horizontal lines are scanned. Generally, a first field is scanned and then a second field is scanned. The lines forming the two fields are interlaced to form a frame.

In video systems such as transmission systems, recording and reproducing systems and the like, transient noise of a random nature may be introduced into the video signal and degrade the signal. In a microwave link, for example, there may be a partial or total failure of carriers. Other random disturbances might be power line or ignition transients.

When reproducing recorded video signals there may be periods of time where there is a dropout (absence) of reproduced signal. The result is degradation of picture in a receiver or monitor. The dropout may be a result of imperfections in the original recording medium. It may also be a result of the cooperative relationship of the transducing device with the recording medium.

As is well known, video signals may be recorded magnetically on magnetic tape and thereafter reproduced to form the original video signals. Suitable magnetic recording systems are described in copending applications Serial No. 427,138 filed May 3, 1954, now Patent No. 2,916,546; Serial No. 506,182, filed May 5, 1955, now Patent No. 2,916,547; Serial No. 524,004, filed July 25, 1955, now Patent No. 2,956,114; Serial No. 614,420, filed October 8, 1956, now Patent No. 2,968,692; and Serial No. 636,536, filed January 28, 1957.

In general, the systems disclosed in said copending applications employ a relatively wide magnetic tape together with a rotating head assembly. The head assembly includes a plurality of circumferentially spaced magnetic heads which scan successfully across the tape as it is moved lengthwise past the head assembly. Margins of the tape are erased and serve to receive sound and control signal information. The remaining laterally extending track portions are of such length that end parts of one track at one edge of the tape contain a recording which is a duplicate of the end part of the next track at the other edge of the tape.

Apparatus of the type described is suitable for recording amplitude modulated signals. However, it has been found desirable to employ a frequency modulated carrier recording in accordance with the system and method disclosed in copending application Serial No. 524,004, above.

If the magnetic tape employed above contains imperfections, such as a void of magnetic particles, which causes dropout, the picture will have transient noise or discontinuities.

It is a general object of the present invention to provide a video system and method in which the effects due to transients are minimized.

It is another object of the present invention to provide a video system and method in which the video signal is delayed and substituted during transients.

It is another object of the present invention to provide a video system for signals which contain redundant information in which delay means serves to delay the output signal and switching means serves to substitute the delayed signal into the output when there is a transient.

It is another object of the present invention to provide a system and method of the above character in which a switching signal is formed when there is a transient, said switching signal serving to switch delayed information into the output to thereby substitute previous signal information during a transient.

It is a further object of the present invention to provide a video recording and reproducing system and method in which effects due to dropout are minimized.

It is a further object of the present invention to provide a video system and method in which a recorded signal is reproduced from a recording medium, a portion of said reproduced signal being delayed for a period of time corresponding to one scanning line and switching means serves to connect the delayed signal to the output when there is a dropout whereby a a previously reproduced line is substituted in the output during the dropout.

These and other objects of the invention will become more clearly apparent from the following description when taken in conjunction with the accompanying drawing.

Referring to the drawing.

Figure 4:
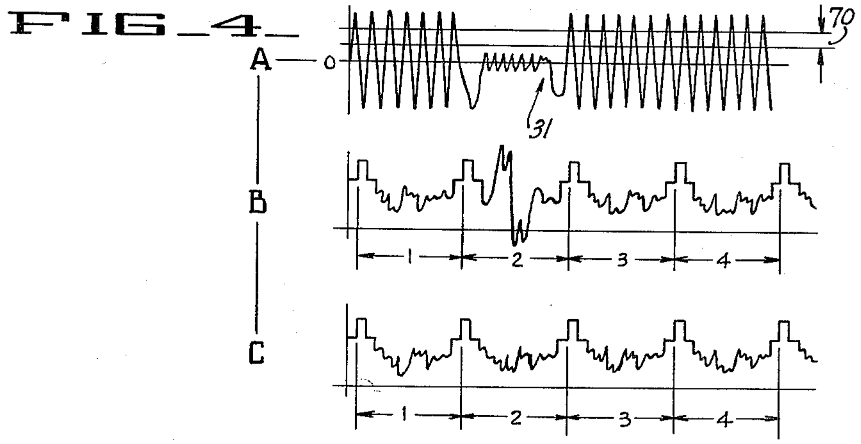
Figure 5:
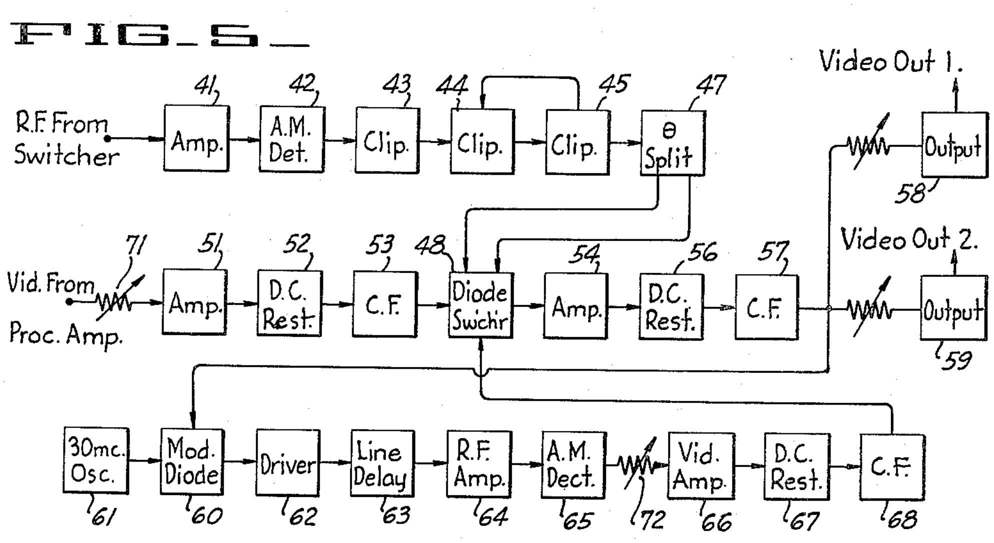
Figure 6A:
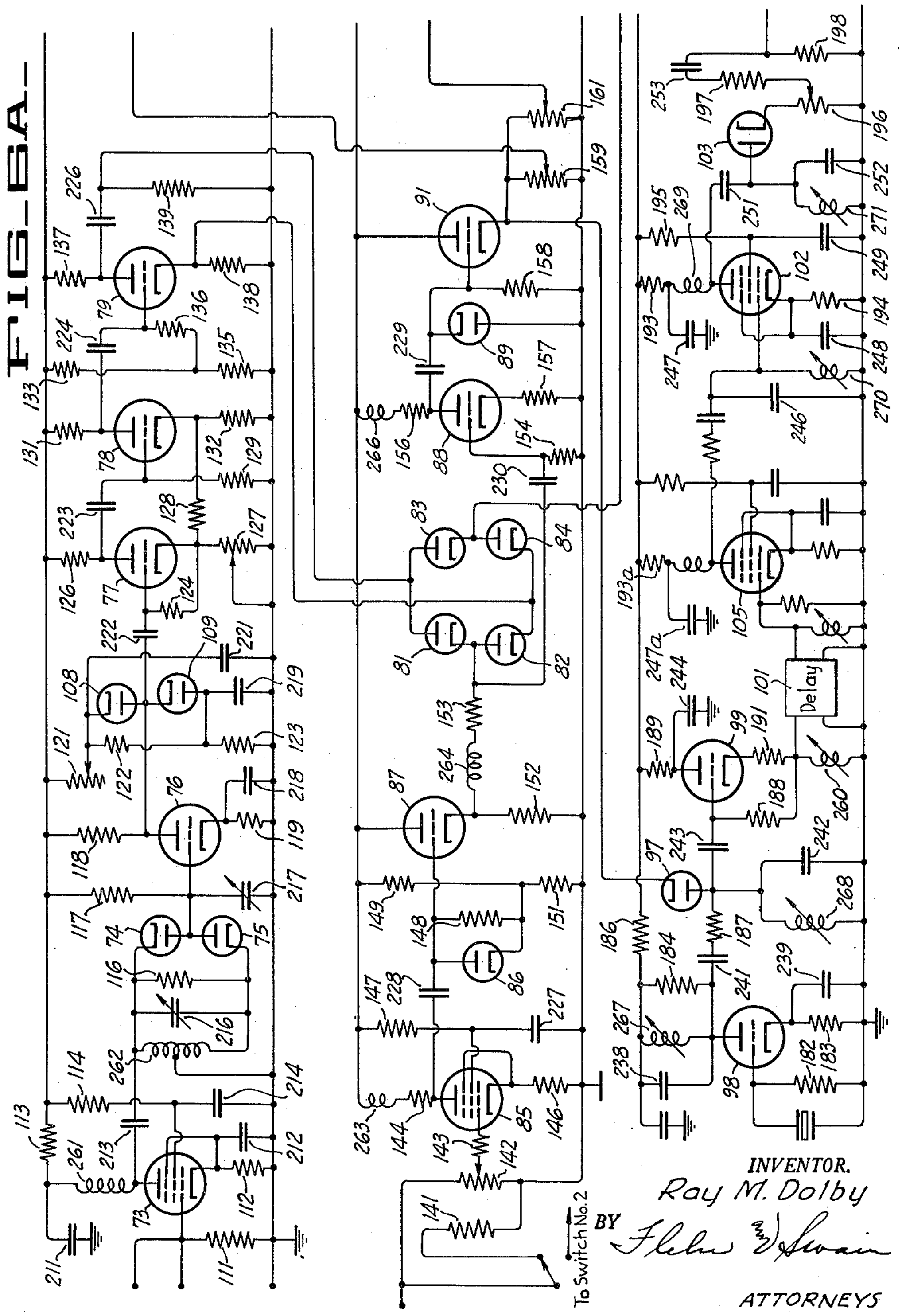
Figure 6B:
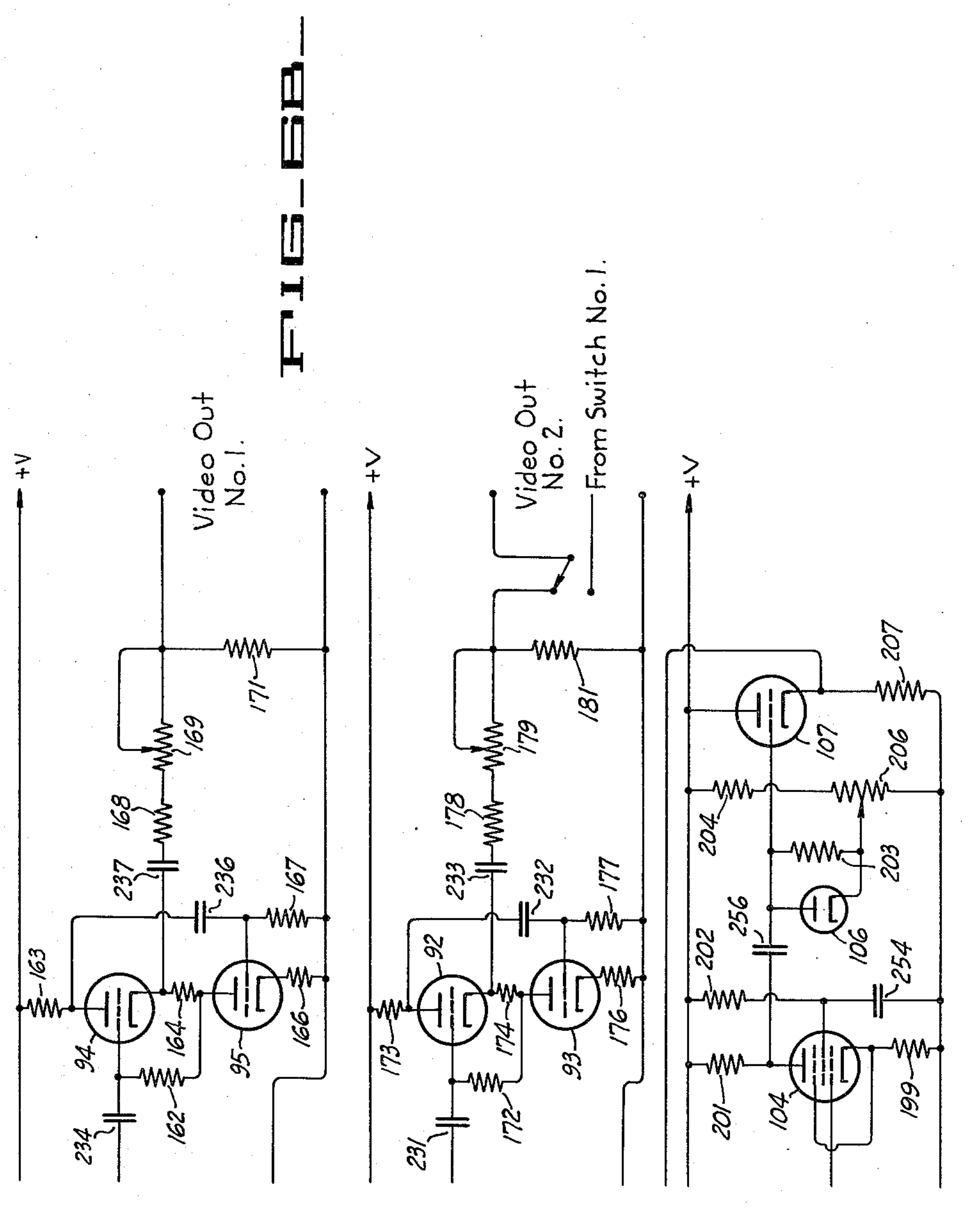

FIGURES 4A–C are waveforms illustrating operation of the system;

FIGURE 5 is a more detailed schematic block diagram showing a record reproducing system in accordance with the present invention; and FIGURES 6A and 6B are detailed circuit diagrams of the reproducing system of FIGURE 5.

Figure 1:
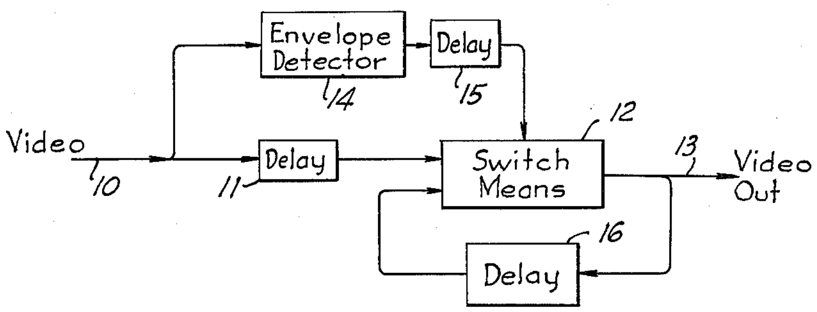
FIGURE 1 is a simplified block diagram schematically illustrating a video system in accordance with the present invention.

Referring to FIGURE 1, the video signal is applied along the line 10 to a video delay means 11. The delay means introduces a delay which is sufficient to effect switching prior to the arrival of the transient at the switching means 12. The switching means is normally closed to connect the line 10 to the output 13. Thus, during normal operation the video signal is applied directly to the output.

The video is sampled by a transient detector 14 which forms a switching signal when a transient is detected. The transient detector may be a peak detector which forms a switching signal when the transients project beyond peak black and white levels. In video systems in which the signal is in the form of a modulated carrier, such as microwave links or magnetic tape systems of the type to be presently described, the transient may be detected by monitoring the carrier.

The switching signal is applied through a delay circuit 15 to the switching means 12 and serves to disconnect the line 10 from the output terminal 13 when there is a transient. Simultaneously, the switching means connects the output of the delay circuit 16 to the output terminal 13. As previously described, delay means 11 serves to delay incoming video, including the transient, until the switching operation has been performed. Delay circuit 15 serves to delay only the trailing edge of the switching signal until the disturbance has passed. The delay circuit 16 is connected to receive information from the output and to delay the same a predetermined period of time and make the delayed video signal available at the input terminal of the switching means.

For example, when reproducing video information the delay means serves to delay the information a period of time corresponding to one scanning line (63.5 microseconds). Thus, when there is a transient in the signal on the line 10, the switching means 12 is switched to the output of the delay line 16 which provides a signal corresponding to the previous scanning line. If the transient continues for more than one scanning line, the last reproduced scanning line will be continuously repeated until the transient is terminated.

In other words, when the information on one line is faulty, information from the previous good line is substituted. Should more than one line be faulty, the last good line is repeated until the fault ends. This procedure is possible because of the inherent similarities between adjacent lines in video picture signals. It is, of course, apparent that the same system may be employed where the signal intelligence is of a redundant nature.

Figure 2:
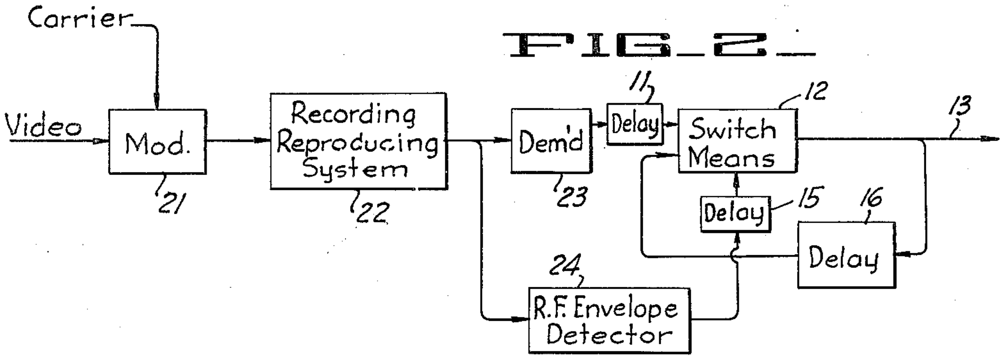
FIGURE 2 is a block diagram schematically showing a recording and reproducing system incorporating the present invention.

Referring to FIGURE 2, a magnetic recording and reproducing system incorporating the invention is illustrated. The system illustrated is of the type in which the recorded information is in the form of a carrier which has been frequency modulated in accordance with the signal intelligence. Thus, the video input is applied to a frequency modulator 21 which modulates a carrier to form a frequency modulated carrier input to the recording and reproducing system 22. The system 22 serves to form a record of the frequency modulated signal intelligence. The modulator 21 may be any suitable frequency modulator and may be of the type described in copending application Serial No. 524,004, above. The recording and reproducing system 22 may be of the type described in said copending applications or may be any other system suitable for recording and reproducing a relatively broad band of frequencies.

The reproduced output is applied to a demodulator 23 which serves to demodulate the frequency modulated carrier to form the original video signal. This signal is applied to the switching means 12, previously described, which connects the line 10 to the output terminals 13. Delay means 11 introduces a predetermined delay in the video, as previously described. Delay means 16 samples the output, delays the same and applies it to the input of the switching means, as previously described. The transient detector 24 is of the carrier monitor type and serves to form a switching signal which serves to switch the switching means to the output of the delay means 16 when there is an absence of carriers from the reproducing system. When the R.-F. envelope amplitude drops below a predetermined level, the existence of a dropout is established and the switching signal is formed.

Figure 3:
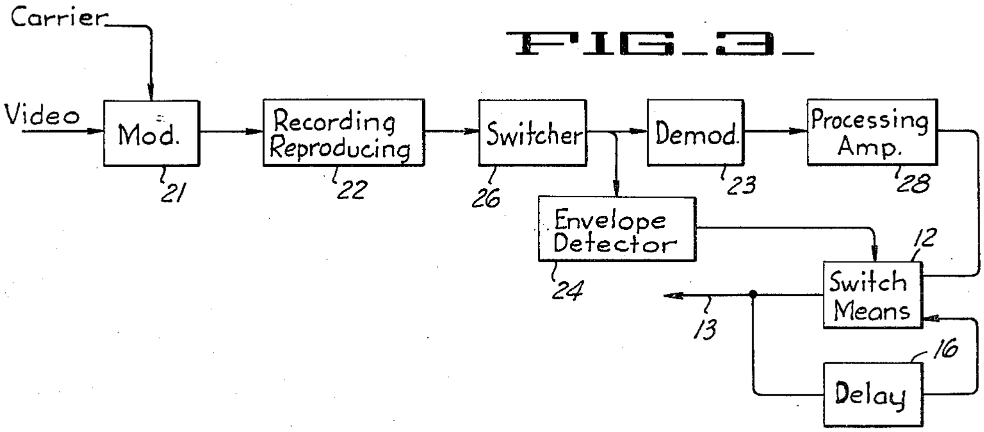
FIGURE 3 shows another recording and reproducing system incorporating the present invention.

Referring to FIGURE 3, a schematic diagram of a reproducing system in accordance with the aforementioned patent applications is illustrated. The modulator 21 may be of the type described in Serial No. 524,004. The recording and reproducing system may be of the type described in said copending applications. Modulator 21 forms a frequency modulated signal suitable for recording.

When employing a system of the character described which includes a plurality of circumferentially spaced magnetic heads, means are provided for switching the reproduced output from one head to the next. Such means are described in copending application Serial No. 614,420, above. The basic function of the switcher 26 is to provide sequential switching between the output of the rotating pickup heads. This switching is necessary in order to eliminate unnecessary noise and crosstalk. The switcher provides automatic timing so that the switching transients occur during horizontal retrace, thereby eliminating the switching transients from the picture.

The output of the switcher is applied to a demodulator 23 and thence to a processing amplifier 28 which may be of the type described in copending application Serial No. 636,536, above. Basically the processing amplifier is designed to make the final output of the video tape recorder acceptable for rebroadcast or retransmission. Its main purpose is to eliminate all objectionable noise from the blanking and sync pulses, and to limit to specified peak values any noise during the picture interval. The processing amplifier, in addition, provides means for correcting video linearity and local or remote control of both video and sync levels.

The output of the processing amplifier 28 is applied to the switching means 12, previously described, and thence to the output 13. A delay line 16 receives a signal from the output and supplies a delayed output to the switching means 12. The envelope detector obtains its signal from the output of the switcher and serves to form a switching signal when there is a dropout.

Operation of the circuit is illustrated by the wave-forms shown in FIGURES 4A–C. In FIGURE 4A the frequency modulated carrier available at the output of the switcher is illustrated. The demodulated and processed signal is illustrated in FIGURE 4B and the output signal is illustrated in FIGURE 4C. It is noted in FIGURE 4A that there is dropout of reproduced signal in the region 31. Only noise components appear during this time. The envelope detector develops a switching signal when there is no R.-F. output. The reproduced signal appearing at the output of the processing amplifier is shown in FIGURE 4B with dropout of the second scanning line. The output at the terminal 13 is of the type shown in FIGURE 4C. Line one is passed by the switching means to the output 13. Line one is delayed by the delay means 16 and applied to the input of the switching means. The switching means is switched during dropout and line one is passed by the switcher to the output. Then lines three and four are passed to the output. Thus, it is seen that the signal at the output does not have any discontinuities which would deteriorate the picture. The repetition of portions of line one is not noticeable because adjacent scanning lines contain redundant information. If there is dropout for more than the scanning line two, say, for example, lines two, three and four, line one would be repeated four times or for as long as there is dropout.

Referring again to FIGURE 3, it is seen that the R.-F. envelope is inspected for dropout at the output of the switching means, The reproduced signal passes through the demodulator and the processing amplifier. A time delay, which may be in the order of a few microseconds, is introduced by the demodulator and processing amplifier. Thus, the switching signal has already set in motion suitable circuitry for switching to the delayed signal before the demodulated results arrive at the output. By exploiting this intrinsic delay in the demodulator and processing amplifier, no transients are seen in the output. The switcher itself is designed to introduce a minimum of disturbance.

Referring to FIGURE 5, a more complete block diagram is shown. The R.-F. signal from the switcher is amplified by amplifier 41 applied to an AM detector 42 which forms an output signal as long as there is no dropout. The output of the detector is clipped by the clipping stages 43, 44 and 45. The clipped signal is applied to a phase splitter 47 and thence to a diode switcher 48.

The output from the processing amplifier is amplified by the amplifier 51, applied to a D.-C. restorer 52, then to a cathode follower 53 and to the diode switcher 48.

The output of the switcher is amplified by amplifier 54, D.-C. restored by restorer 56 and applied to a cathode follower 57. The output of the cathode follower is applied to the output amplifier stages 58 and 59.

The output from the cathode follower 57 is also applied to a modulating diode 60 which is driven from a crystal oscillator 61. The output of the modulating diode is applied to driver 62 and thence to a delay circuit 63. The output of the delay circuit is amplified by amplifier 64, detected by detector 65, and applied to a video amplifier 66. The signal is D.-C. restored in restorer 67 and applied to a cathode follower 68 whose output is applied to the diode switcher 48. The output of the cathode follower 68 is the video information which has been delayed by one line and is suitable for substitution in the event of dropout.

The dropout detection circuit includes a slicing window to select a very narrow portion of the amplitude demodulated R.-F. signal as indicated at 70, FIGURE 4A. The AM detector 42 is preferably a full wave detector for good response time. The line delay circuit is of the amplitude modulated R.-F. carrier type, the one used being a quartz unit operating at 30 megacycles. The 30 megacycle crystal controlled oscillator output is linearly modulated by the video output signal and is used through the buffer stage 62 to drive the delay circuit 63. The output of the delay circuit is a 30 megacycle amplitude modulated R.-F. carrier which is detected by the AM detector 65 to recover the video.

To make a substitution invisible, the gain, frequency response, and D.-C. level of the main and delay channels must be identical. The gain and D.-C. levels are independently adjustable as indicated at 71 and 72.

The circuit receives the R.-F. from the switcher and detects the narrow window. With amplitude variations of the R.-F. envelope, an output signal is formed and clipped and applied to the phase splitter causing the diode switcher to connect the output of this delay circuit to the output. In the absence of amplitude variations of the R.-F. envelope, the diode switcher is maintained in condition for passing the video signal from the processing amplifier to the output amplifiers. Or, the switch may substitute the previously reproduced information which has been delayed a period of time corresponding to one scanning line. The delayed, previously reproduced information is applied until the dropout is terminated.

Referring to FIGURE 6, a detailed circuit diagram for the block diagram of FIGURE 5 is presented. The circuitry associated with the tube 73 forms the amplifier 41. The circuitry including the diodes 74 and 75 serves as the detector 42. The circuitry including tubes 76, 77, 78 and 79 serve the function of clippers 43, 44 and 46 and of phase splitter 47, respectively.

The diodes 81–84 serve as the diode switcher 48 and are controlled by the output from the phase splitter 47. The video signal is amplified by the amplifier 51 including the tube 85 and associated circuitry. The D.-C. restorer circuit 52 includes the diode 86. The cathode follower circuit 53 includes the circuitry associated with the tube 87. The amplifier D.-C. restorer and cathode follower circuits 54, 56 and 57 comprise the tubes 88, 89 and 91 and associated circuitry, respectively. The output amplifiers 58, 59 include the tubes 92, 93 and 94, 95, respectively. The modulating diode 60 is represented by the diode 97 and the 30 mc. oscillator 61 including the vacuum tube 98 and associated circuitry. The driver 62 includes the tube 99 and associated circuitry. The delay line 63 is represented by the 63.5 microsecond delay line 101. The R.-F. amplifier 64 AM detector 65, amplifier 66 and D.-C. restorer 67 are represented by the tubes 102, 103, 104, 105, 106 and associated circuitry.

A reproducing system in accordance with FIGURES 6A and 6B was constructed and tested. The various components in the test circuit had the following values:

*Tubes*

| | | | |
|---|---|---|---|
| **73** | 6AH6 | **93** | 5687 |
| **76** | 12AT7 | **94** | 5687 |
| **77** | 12AT7 | **95** | 5687 |
| **78** | 5687 | **98** | 5687 |
| **79** | 5687 | **99** | 5687 |
| **85** | 6AH6 | **102** | 6AH6 |
| **87** | 5687 | **104** | 6AH6 |
| **88** | 12AT7 | **105** | 6AH6 |
| **91** | 12AT7 | **107** | 5687 |
| **92** | 5687 | | |

*Diodes*

| | | | |
|---|---|---|---|
| **74** | IN279 | **89** | IN279 |
| **75** | IN279 | **97** | IN279 |
| **81** | IN279 | **103** | IN279 |
| **82** | IN279 | **106** | IN279 |
| **83** | IN279 | **108** | IN279 |
| **84** | IN279 | **109** | IN279 |
| **86** | IN279 | | |

*Resistors*

| | | | | | |
|---|---|---|---|---|---|
| **111** | ohm | 100K | **163** | ohm | 1K |
| **112** | do | 150 | **164** | do | 68 |
| **113** | do | 1K | **166** | do | 68 |
| **114** | do | 47K | **167** | do | 680K |
| **116** | do | 10K | **168** | do | 22 |
| **117** | do | 150K | **169** | do | 50 |
| **118** | do | 33K | **171** | do | 22K |
| **119** | do | 100 | **172** | do | 680K |
| **121** | do | 25K | **173** | do | 1K |
| **122** | do | 1K | **174** | do | 68 |
| **123** | do | 22K | **176** | do | 68 |
| **124** | do | 680K | **177** | do | 680K |
| **126** | do | 10K | **178** | do | 22 |
| **127** | do | 2.5K | **179** | do | 50 |
| **128** | do | 1.5K | **181** | do | 22K |
| **129** | do | 680K | **182** | do | 10K |
| **131** | do | 4.7K | **183** | do | 560 |
| **132** | do | 470 | **184** | do | 47K |
| **133** | do | 220K | **186** | do | 1K |
| **135** | do | 4.7K | **187** | do | 1.5K |
| **136** | do | 680K | **188** | do | 100K |
| **137** | do | 3.3K | **189** | do | 560 |
| **138** | do | 1.5K | **191** | do | 560 |
| **139** | do | 2.7K | **193** | do | 1K |
| **141** | do | 82 | **193*a*** | do | 1K |
| **142** | do | 1K | **194** | do | 150 |
| **143** | do | 100 | **194*a*** | do | 150 |
| **144** | do | 1.5K | **195** | do | 47K |
| **146** | do | 82 | **195*a*** | do | 47K |
| **147** | do | 68K | **196** | do | 5K |
| **148** | do | 100K | **197** | do | 100 |
| **149** | do | 220K | **197*a*** | do | 100 |
| **151** | do | 2.2K | **198** | megohm | 1 |
| **152** | do | 1.5K | **199** | ohm | 150 |
| **153** | do | 2.2K | **200** | do | 820 |
| **154** | megohm | 1 | **201** | do | 2.2K |
| **156** | ohm | 1.5K | **202** | do | 47K |
| **157** | do | 390 | **203** | do | 100K |
| **158** | do | 100K | **204** | do | 220K |
| **159** | do | 2.5K | **206** | do | 5K |
| **161** | do | 2.5K | **207** | do | 1.5K |
| **162** | do | 680K | | | |

*Capacitors*

| | | | | | |
|---|---|---|---|---|---|
| **211** | mf | .02 | **236** | mf | .1 |
| **212** | do | .02 | **237** | do | 300 |
| **213** | do | 100 | **238** | mmf | 5 |
| **214** | do | .001 | **239** | mf | .01 |
| **216** | do | .0001 | **241** | do | .001 |
| **217** | do | .0001 | **242** | mmf | 5 |
| **218** | do | 50 | **243** | mf | .001 |
| **219** | do | 20 | **244** | do | .01 |
| **221** | do | 20 | **246** | mmf | 5 |
| **222** | do | 22 | **247** | mf | .01 |
| **223** | do | .22 | **247*a*** | do | .01 |
| **224** | do | .22 | **248** | do | .001 |
| **226** | do | 10 | **248*a*** | do | .001 |
| **227** | do | 20 | **249** | do | .001 |
| **228** | do | 4 | **249*a*** | do | .001 |
| **229** | do | 4 | **251** | do | .001 |
| **230** | do | .22 | **251*a*** | do | .001 |
| **231** | do | .1 | **252** | mmf | 5 |
| **232** | do | .1 | **253** | mf | .22 |
| **233** | do | 300 | **254** | do | 20 |
| **234** | do | .1 | **256** | do | 4 |

*Inductors*

| | mH (microhenry) | | |
|---|---|---|---|
| 260 | 1–1.7 | 267 | 1–1.7 |
| 261 | 100 | 268 | 1–1.7 |
| 262 | 20 | 269 | 10 |
| 263 | 25 | 269*a* | 10 |
| 264 | 10 | 270 | 1–1.7 |
| 266 | 25 | 270*a* | 1–1.7 |
| | | 271 | 1–1.7 |

*Crystal:* 30 mc.

*Delay line:* 63.5 microseconds

*Voltages:* +V–250V

Thus, it is seen that there is provided an improved video system in which transients due to dropout or other causes are minimized. The system finds particular usefulness in reproducing recordings, such as magnetic tape recordings, which contain redundant information such as video signals.

I claim:

1. A video system for processing video signal information comprising input means, output means, switching means normally connecting the input to the output, detecting means serving to receive the video signal information and develop a switching signal when there is a transient in said video signal information, said detecting means connected to apply said switching signal to the switching means, and circuit means serving to receive the output signal and serving to introduce a predetermined time delay in the information, the output of said circuit means being applied to the input of said switching means, said switching means serving to selectively connect the output of said circuit means to the output means in response to a switching signal.

2. A video system for processing video signal information in the form of a carrier modulated in accordance with the video information comprising input means, output means, switching means normally connecting the input means to the output means, detector means for receiving the modulated carrier and serving to form a switching signal when there is a transient in the modulated carrier, said detector means connected to apply the switching signal to the switching means, and circuit means connected to the output means and serving to delay the information signal a predetermined period of time, said circuit means connected to apply the delayed information signal to the switching means, said switching means being responsive to the switching signal to selectively connect the output of said circuit means to the output means.

3. A video system in which the video signal includes a plurality of horizontal scanning cycles comprising input means, output means, means for receiving the video signal and serving to develop a switching signal when there is a transient in the video signal, switching means adapted to normally connect the input means to the output means, circuit means connected to said output means to delay the output signal for a period of time corresponding to one horizontal scanning cycle, said switching means being responsive to the switching signal to selectively connect the output of the circuit means to the output means.

4. A video system as in claim 3 in which a delay means is interposed between the input means and the switching means to introduce a predetermined delay in the video signal.

5. A video system as in claim 3 in which a trailing edge delay means is interposed between the means developing a switching signal and the switching means.

6. A system for reproducing recorded signal information of the type which includes periodically occurring redundant information comprising means for reproducing the recorded information, output means, switching means normally applying the reproduced information to the ouput means, detecting means receiving the reproduced signal and serving to form a switching signal when there is a predetermined transient in the reproduced information, said detecting means connected to apply said switching signal to the switching means, and circuit means for receiving the output signal and serving to introduce a time delay corresponding to one period of the redundant information, the output of said circuit means being applied to the input of said switching means, said switching means serving to apply delayed information from said circuit means to the output means in response to the switching signal.

7. A system for reproducing recorded video signal information recorded along a plurality of scanning lines including means for reproducing said signal, output means, switching means normally connecting the reproducing means to the output means, means for receiving the reproduced information and serving to form a switching signal when there is a dropout of reproduced information, and circuit means connected to said output means for receiving the reproduced information and delaying the same a period of time corresponding to one scanning line of said video information, the delayed output of said circuit means being applied to the input of said switching means, said switching means being responsive to the switching signal to connect the circuit means to the output means in response to the switching signal.

8. A system for reproducing a record of periodically redundant information in the form of a carrier frequency modulated in accordance with the information, reproducing means for reproducing said frequency modulated carrier, output means, demodulating means connected to receive the frequency modulated carrier and demodulate the same, switching means connected to receive the demodulated information and apply the same to the output means, detector means for receiving the reproduced frequency modulated carrier and serving to form a switching signal, said detector means connected to apply the switching signal to the switching means, and circuit means connected to said output means for receiving the output information and delaying the same a period of time corresponding to one period of the redundant information, said circuit means connected to apply the delayed information to the input of said switching means, said switching means being responsive to the switching signal to selectively connect the output means to receive the demodulated information or delayed information.

9. In a system for reproducing recorded video information of the type which includes a plurality of horizontal scanning cycles, means for reproducing the recorded information, output means, means for receiving the reproduced information and serving to develop a switching signal when a transient in the signal information occurs, switching means connected to receive the reproduced information and serving to apply the same to the output means, and circuit means serving to receive the output signal at said output means and to delay the same for a period of time corresponding to one scanning cycle, said switching means being responsive to the switching signal to selectively connect and disconnect the reproducing means and the delay means to the output means in response to the switching signal.

10. In a system for reproducing recorded video information of the type which includes a plurality of horizontal scanning cycles, means for reproducing said recorded information, means for receiving said reproduced information and serving to develop a control signal when there is a dropout, switching means having a first input coupled to said reproducing means and normally connecting said reproducing means to an output means, and circuit means connected to receive the output from the switching means and serving to introduce a delay corresponding to one scanning cycle, said delayed signal being applied to a second input of said switching means, said switching means serving to selectively switch between said first and second inputs in response to the switching signal.

11. A system for reproducing recorded information of the type which includes periodically redundant information comprising means for reproducing said recorded information to form a reproduced information signal, means responsive to dropout in said reproduced information to form a control signal, output means, means for receiving said information signal at said output means and introducing a delay corresponding to one period of said redundant information, and means responsive to said control signal for selectively applying said reproduced signal and said delayed signal to said output means whereby a continuous output wave is formed.

12. A system for reproducing recorded video information of the type which includes a plurality of scanning cycles comprising means for reproducing the recorded information, means for receiving said information to form a switching signal responsive to dropout, output means, means for receiving said reproduced information at said output means and introducing a delay corresponding to one scanning cycle, and means responsive to said switching signal to selectively apply said reproduced information and delayed information to said output means whereby a continuous output signal is provided.

13. A system for reproducing a record of a frequency modulated carrier modulated in accordance with a video signal of the type which includes a plurality of scanning cycles comprising means for reproducing said record to form a frequency modulated carrier, means for detecting said frequency modulated carrier to form a control signal in response to dropout, means for demodulating said frequency modulated carrier to reform the video signal, output means, means for receiving the video signal at said output means and introducing a delay corresponding to one scanning cycle, and means for selectively connecting said output means to receive the delayed and reproduced information in response to said control signal.

14. In a system of the character described in which periodically redundant information in the form of a carrier which is frequency modulated in accordance with the information is recorded in the form of successive scanning lines, means for reproducing the frequency modulated carrier as recorded, first switching means serving to selectively switch to the reproducer to form a continuous frequency modulated carrier, output means, demodulating means connected to receive the continuous frequency modulated carrier and demodulate the same, second switching means connected to receive the demodulated information and apply the same to the output means, detector means for receiving the reproduced continuous frequency modulated carrier and form a switching signal when a transient occurs, said detector means connected to apply the switching signal to the second switching means, and circuit means for receiving the information at said output means and delaying it for a period of time corresponding to one period of the redundant information, said circuit means connected to apply the delayed information to the input of said second switching means, said second switching means being responsive to the switching signal to selectively connect the output means to receive the demodulated information or the delayed information.

References Cited in the file of this patent

UNITED STATES PATENTS

| | | |
|---|---|---|
| 2,353,631 | Bliss | July 18, 1944 |
| 2,816,162 | Johnson | Dec. 10, 1957 |
| 2,823,255 | Hall | Feb. 11, 1958 |